United States Patent
Brown et al.

(10) Patent No.: US 9,409,462 B2
(45) Date of Patent: Aug. 9, 2016

(54) CONVERTIBLE TOP

(71) Applicant: GAHH, LLC, North Hollywood, CA (US)

(72) Inventors: Martin Brown, Victoria (CA); Neshan Markarian, North Hollywood, CA (US); John Bath, Fenwick (CA)

(73) Assignee: GAHH, LLC, North Hollywood, CA (US)

( * ) Notice: Subject to any disclaimer, the term of this patent is extended or adjusted under 35 U.S.C. 154(b) by 834 days.

(21) Appl. No.: 13/665,733

(22) Filed: Oct. 31, 2012

(65) Prior Publication Data

US 2013/0057017 A1  Mar. 7, 2013

Related U.S. Application Data

(62) Division of application No. 11/844,226, filed on Aug. 23, 2007, now Pat. No. 8,336,948.

(60) Provisional application No. 60/939,824, filed on May 23, 2007.

(51) Int. Cl.
  *B60J 1/18* (2006.01)

(52) U.S. Cl.
  CPC .................. *B60J 1/1815* (2013.01)

(58) Field of Classification Search
  USPC ........................ 296/107.04, 107.07
  See application file for complete search history.

(56) References Cited

U.S. PATENT DOCUMENTS

| 5,040,844 | A | 8/1991 | Stolz et al. |
| 5,320,400 | A | 6/1994 | Orth et al. |
| 5,464,265 | A | 11/1995 | Hemmis et al. |
| 5,558,390 | A | 9/1996 | Hemmis et al. |
| 5,560,671 | A | 10/1996 | Ojanen et al. |
| 6,015,181 | A | 1/2000 | Exner |
| 6,471,283 | B2 | 10/2002 | Windpassinger et al. |
| 6,620,365 | B1 | 9/2003 | Odoi et al. |
| 6,935,677 | B2 | 8/2005 | Nania |

FOREIGN PATENT DOCUMENTS

| DE | 42 10 492 C1 | 4/1993 |
| DE | 202 07 069 U1 | 8/2002 |
| DE | 20207069 U1 * | 8/2002 |
| EP | 0 754 581 A1 | 1/1997 |
| EP | 0 878 337 A1 | 11/1998 |

OTHER PUBLICATIONS

Definition of "ring" in Merriam Webster's Collegiate Dictionary, 10th edition. 1996.*
Communication from the European Patent Office forwarding European Search Report dated Oct. 20, 2008, 1 page; European Search Report for Application No. EP 08 15 7893, completion of search Oct. 2, 2008, 3 pages.

* cited by examiner

*Primary Examiner* — H Gutman
(74) *Attorney, Agent, or Firm* — Lewis Roca Rothgerber Christie LLP

(57) ABSTRACT

A convertible top having a glass window attached to the top by positioning a ring around a window opening in the soft top and wrapping an edge of the window opening around at least a portion of the ring. An adhesive is positioned between the edge portion of the ring and the soft top and the glass window is positioned over the ring and secured thereto by an adhesive.

6 Claims, 2 Drawing Sheets

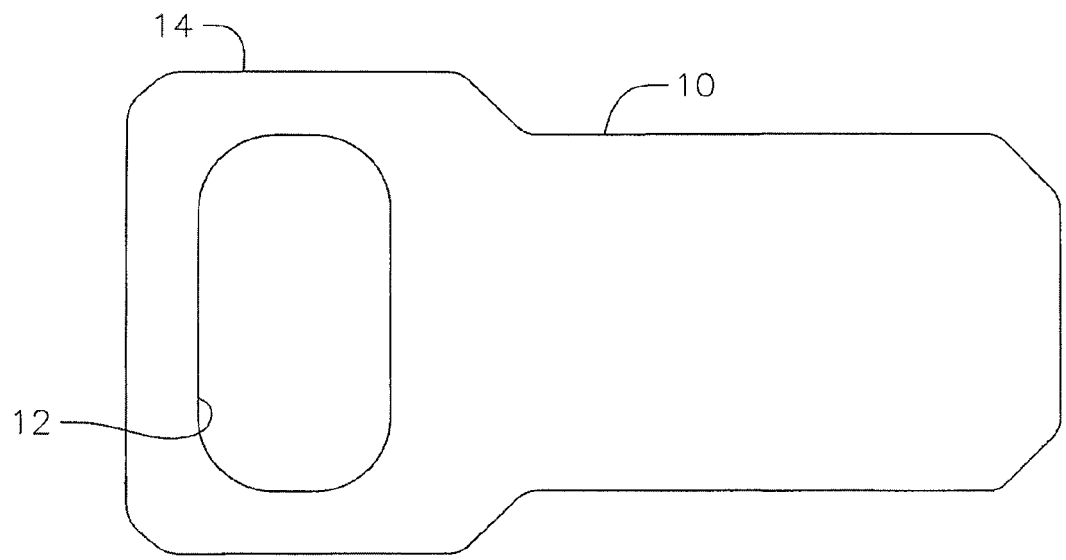
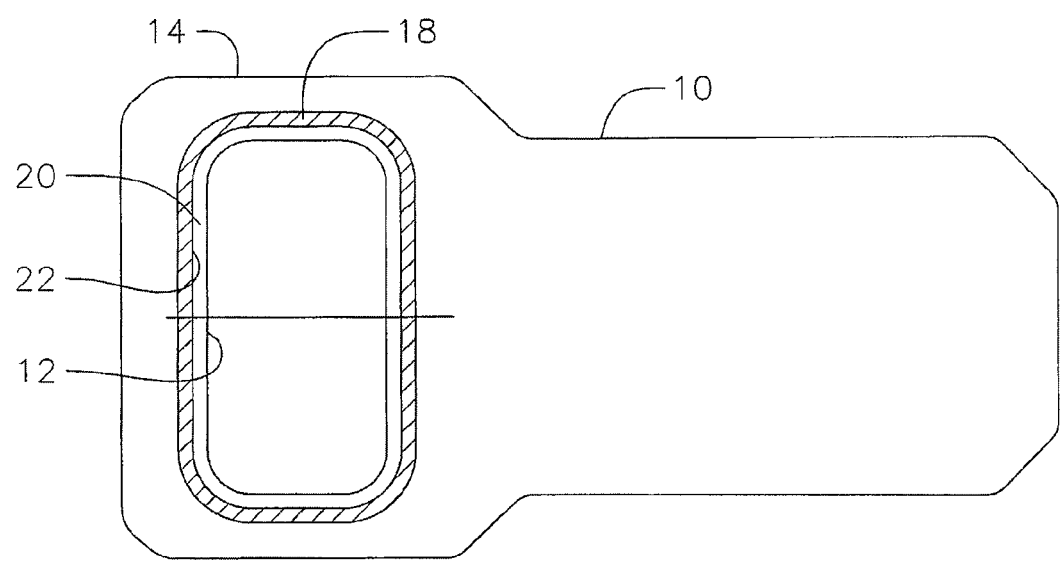

CONVERTIBLE TOP

CROSS-REFERENCE TO RELATED APPLICATION(S)

This Application is a divisional application of U.S. patent application Ser. No. 11/844,226 filed Aug. 23, 2007, claims priority to U.S. Provisional Application No. 60/939,824, filed May 23, 2007, the entire contents of which are hereby expressly incorporated by reference.

BACKGROUND OF THE INVENTION

The present invention is directed to a method of installing a glass window in a soft auto top, and more particularly, to the incorporation of a metal ring between the soft top material and the glass window for proper bonding.

The attachment of a glass window in a soft auto top has been an age-old problem. Several previous methods of installing a glass window to a soft top include bonding the glass directly to the soft top using various glues, silicones or other similar bonding agents. Another previous method includes taping the window directly to the soft top using double sided tape, such as 3M VHB tape. Still, other methods include bonding the window to the soft top using a thermally activated adhesive or tape, molding or encapsulating the window into the soft top, or clamping the window into the soft top using various fasteners.

Typically, soft auto tops are constructed using vinyl or canvas. Both of these materials are very difficult, if not impossible, to bond to a glass surface. Therefore, soft tops have traditionally had windows constructed of plastic so that they could be sewn into the auto top. However, the plastic windows tended to scratch and discolor easily, leading to severe impairment of vision. Because of this problem, consumers demanded auto tops having glass windows installed. This demand lead to auto top manufacturers to utilize the previously identified methods to install a glass window into a soft top, however, these prior methods have had numerous disadvantages and problems, including, a high rate of failure of the bond holding the window to the top, resulting in the window falling out of the top and/or leaking water into the vehicle. Another problem associated with prior methods is that they required expensive tooling and equipment to achieve the required bond between the glass and the soft top material. Prior methods required a high degree of skilled labor and these processes were very labor intensive. Yet, another problem is that it is difficult to replace a glass window in the same soft top in the event a window is broken or to have more than one window installed in the top.

Aesthetically, the outside joint between the soft top and the window is cosmetically unappealing. In addition, the use of clamps and fasteners are expensive when needed in low volumes, such as the after market or replacement top segment, which makes the top more expensive and less affordable for consumers. Consequently, a need exists for a new method for installing a glass window in a folding or removable soft auto top which addresses the problems associated with prior methods.

SUMMARY OF THE INVENTION

The present invention is a new method for installing a glass window in a folding or removable soft auto top, which addresses the problems associated with prior methods by not requiring the soft top material to be bonded directly to the glass window. The method includes the introduction of a ring, as an intermediary between the soft top material and the glass window, which provides a low cost, reliable solution to the problems encountered by prior methods of glass window installation in soft auto tops.

The method of the present invention begins with the selection of a soft top for installation of the glass window. Next, a glass window to be installed in the auto top is selected. A hole, slightly smaller than the window, is cut into the auto top in the location where the window is to be installed. Next, a retainer ring that has been sized to the window is selected and then placed on the auto top over the hole so that the perimeter of the hole extends evenly past the inside diameter of the ring. Next, an adhesive is applied to the ring and the portion of the top extending past the ring. Alternatively, or in addition to, an adhesive may be applied to that portion of the auto top that the ring will rest on, prior to placing the ring on the auto top. Next, the portion of the auto top extending past the ring is rolled or pressed around the exposed surface of the ring, thereby encasing all, or a portion of, the ring with the auto top. A bonding agent, such as an automotive urethane sealant, is then applied to the auto top in the area of the auto top that the window will be attached to. Finally, the window is placed onto the soft top such that the bonding agent is compressed between the soft top and the window. Once the bonding agent has cured, the installation is complete.

The advantages of the present invention over prior methods of window installation include faster installation time, reduced worker skill level, improved cosmetics, a stronger bond between the soft top material and the window, elimination of the need for expensive and complicated processing machinery, significant reduction in tooling or fixture costs, and the ability for multiple glass windows to be installed in the same auto soft top.

BRIEF DESCRIPTION OF THE DRAWINGS

FIG. 1 is a plan view of an auto soft top having a hole for a glass window;

FIG. 2 is a plan view of FIG. 1 including a ring placed around the window opening;

DETAILED DESCRIPTION OF THE INVENTION

Figure 3:
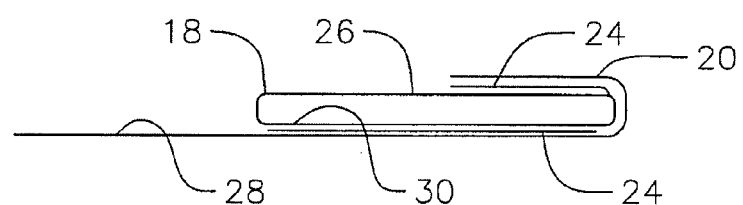
FIG. 3 is a partial cross-sectional view of the ring and soft top.

Referring to the drawings, a method for installing a glass window in a folding or removable soft top is illustrated. Initially, an auto soft top 10 is selected. The size and configuration of the soft top is selected to fit the make and model of the automobile for which it is intended. Typically, the soft top is made of vinyl or canvas. A hole 12 is cut into the soft top in a rear portion 14 corresponding to the location of a rear window. The size of the hole 12 is slightly smaller than the outer dimension of the window to be installed. Similarly, a glass window 16 is selected, having a size and configuration which is specific for the type of vehicle for which the soft top is intended. A metal retainer ring 18 which is sized to have an outer dimension substantially matching the outer dimension of the window, is selected and placed onto the auto top 10 over the hole 12 so that a portion 20 of the soft top extends beyond an inside perimeter 22 of the retaining ring 18. Portion 20 should uniformly extend inside the inside perimeter 22 of the ring 18 around the entire hole 12.

Figure 4:
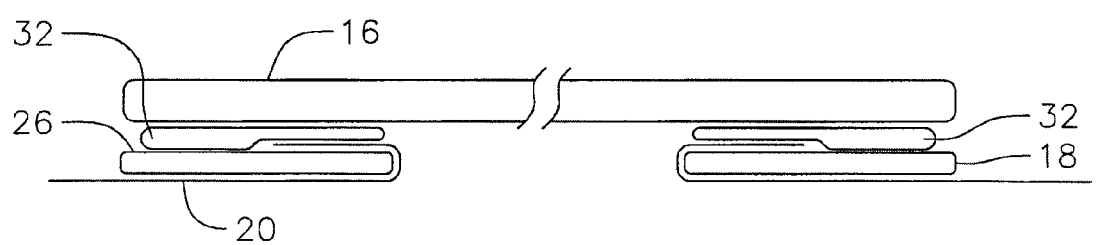
FIG. 4 is a cross-sectional view of the installed glass window to the soft top.

An adhesive 24, is applied to portion 20 of the soft top, which is then wrapped around the ring and secured to an inside surface 26 of the ring 18. Alternatively, or in addition thereto, adhesive 24 can be applied between an inside surface 28 of soft top portion 20 and an outside surface 30 of ring 18. This adhesive would be positioned between the ring and the soft top prior to installing the ring on the soft top. As indicated portion 20 extending past the ring is then rolled or pressed around the ring, thereby encasing at least a portion of the ring with the soft top, as seen best in FIG. 3. Referring specifically to FIG. 4, the window 16 is then mounted by placing a bonding agent 32 such as an automotive urethane sealant, to the inside surface 26 of the ring and the window is then placed upon the bonding agent 32.

The present invention provides a method of attaching a glass window to an automotive soft top by bonding each of the glass window and the soft top to a metal retaining ring. Prior problems of adhering a glass window to a soft top are eliminated by each of the glass window and the soft top being separately attached to the metal ring. The present invention eliminates the problem of adhering glass to canvas or vinyl by allowing the glass to be adhered to a metal ring and the canvas or vinyl to be adhered to a metal ring. Consequently, a stronger and weather proof seal is created between the window and the soft top.

Although the present invention has been described and illustrated with respect to a preferred embodiment thereof, changes and modifications can be made therein which are within the full intended scope of the invention as herein after claimed.

What is claimed is:

1. A convertible top comprising:
   an outer soft top having a window opening;
   a preformed ring positioned around the window opening such that an edge portion of the soft top at the window opening wraps around at least a portion of the ring and is secured thereto; and
   a glass window having an exterior surface secured to the ring and the edge portion of the soft top wrapped around the ring at the window opening.

2. The convertible top of claim 1 wherein the edge portion of the soft top at the window opening is secured to the ring by an adhesive between the edge portion of the soft top at the window opening and the ring.

3. The convertible top of claim 2 wherein the adhesive is positioned on an inside surface of the ring.

4. The convertible top of claim 2 wherein the adhesive is positioned on an outside surface of the ring.

5. The convertible top of claim 1 wherein the glass window is secured by a sealant.

6. The convertible top of claim 5 wherein the sealant is an adhesive.

\* \* \* \* \*